United States Patent
Blestel et al.

(10) Patent No.: US 9,848,220 B2
(45) Date of Patent: Dec. 19, 2017

(54) METHOD AND SYSTEM FOR ENCODING AND MULTIPLEXING PROGRAMS OF A PLURALITY OF TELEVISION CHANNELS

(71) Applicant: Ericsson IT Solutions & Services SAS, Massy (FR)

(72) Inventors: Mederic Blestel, Bruz (FR); Olivier Milet, Saint-Gregoire (FR); Thomas Fayoux, Saint-Gilles (FR)

(73) Assignee: ERICSSON IT SOLUTIONS & SERVICES SAS, Massy (FR)

(*) Notice: Subject to any disclaimer, the term of this patent is extended or adjusted under 35 U.S.C. 154(b) by 0 days.

(21) Appl. No.: 15/291,752

(22) Filed: Oct. 12, 2016

(65) Prior Publication Data

US 2017/0150194 A1 May 25, 2017

(30) Foreign Application Priority Data

Oct. 13, 2015 (FR) .................................... 15 59714
May 2, 2016 (FR) .................................... 16 53964

(51) Int. Cl.
*H04N 7/173* (2011.01)
*H04N 7/10* (2006.01)
(Continued)

(52) U.S. Cl.
CPC ... *H04N 21/23655* (2013.01); *H04N 21/2385* (2013.01); *H04N 21/25841* (2013.01);
(Continued)

(58) Field of Classification Search
None
See application file for complete search history.

(56) References Cited

U.S. PATENT DOCUMENTS

2007/0277210 A1 11/2007 Yousef
2009/0161697 A1 6/2009 Wang et al.
(Continued)

FOREIGN PATENT DOCUMENTS

FR          3002062 A1    8/2014
WO       2012019889 A1    2/2012

OTHER PUBLICATIONS

French Search Report and Written Opinion dated Feb. 16, 2017, for corresponding French Application No. 1653964, filed May 2, 2016.
(Continued)

*Primary Examiner* — William J Kim
(74) *Attorney, Agent, or Firm* — David D. Brush; Westman, Champlin & Koehler, P.A.

(57) ABSTRACT

A solution is proposed for encoding/multiplexing programs of national television channels and at at least one group of regional channels. A plurality of encoders works in variable bit rate (each is called national or regional depending on whether it receives programs from a national or regional television channel). An aggregator device generates at least one piece of common information from the information coming from the regional encoders. A statistical allocator receives it along with information coming from national encoders and gives a dedicated set of encoding parameters to each national encoder and a common set of encoding parameters to the regional encoders. For each region, a multiplexer generates a multiplexed signal from output signals of the national encoders and from the output signal of the encoder associated with the regional channel of this region.

8 Claims, 5 Drawing Sheets

(51) Int. Cl.
    *H04N 7/025*     (2006.01)
    *H04N 21/2365*     (2011.01)
    *H04N 21/2662*     (2011.01)
    *H04N 21/2385*     (2011.01)
    *H04N 21/258*     (2011.01)
    *H04N 21/643*     (2011.01)
    *H04N 21/61*     (2011.01)

(52) U.S. Cl.
    CPC ..... *H04N 21/2662* (2013.01); *H04N 21/6112* (2013.01); *H04N 21/6118* (2013.01); *H04N 21/64322* (2013.01)

(56) References Cited

U.S. PATENT DOCUMENTS

| | | |
|---|---|---|
| 2013/0215328 A1 | 8/2013 | Lhermitte et al. |
| 2014/0226724 A1 | 8/2014 | Sorin et al. |

OTHER PUBLICATIONS

English translation of the French Written Opinion dated Feb. 16, 2017, for corresponding French Application No. 1653964, filed May 2, 2016.

METHOD AND SYSTEM FOR ENCODING AND MULTIPLEXING PROGRAMS OF A PLURALITY OF TELEVISION CHANNELS

1. TECHNICAL FIELD

The invention is situated in the field of television broadcasting. The goal is to broadcast a maximum of channels (also called "streams" or "television channels") for a given bandwidth in order to reduce transmission costs while ensuring high-quality video. The broadcasting can be done by different means and especially, but not exclusively, by terrestrial broadcasting, cable or IPTV, (Internet Protocol TeleVision).

More specifically, the invention relates to a method, as well as to a corresponding system, for the encoding and multiplexing of programs of a plurality of television channels comprising national channels, supplying national programs and at least one group of regional channels, each associated with a different region and providing regional programs during regional slots and sharing national programs outside regional slots.

A television program comprises a plurality of binary streams (for example one video stream, two audio streams and one metadata stream.

Traditionally, television channels used to be broadcast at a constant bit rate (CBR) in order to ensure high quality video. However, each type of content, by its nature, calls for a different bit rate. Thus, sports content requires higher bit rate than a simple television broadcast.

In order to optimize bandwidth, statistical multiplexing has been introduced. It enables the dynamic allocation of a bit rate as a function of the content. The streams within a statistical multiplexing system are therefore encoded at a variable bit rate (in VBR mode). Statistical multiplexing reduces the average bit rate used per stream and thus optimizes the bandwidth by adding channels without impairing quality. The gain in bandwidth is correlated with the number of streams of which it is formed (i.e. the number of streams covered by the statistical multiplexing).

However, within such a statistical multiplexing system, it is sometimes appropriate to take account of regional variations (also referred to as "regional cutaways" or "regional handovers"). Indeed, for certain groups of regional television channels, there is a practice known as "regional variation" in which a national program "common to this group of regional channels" is replaced by a regional program (for example regional content or a local advertisement) for a certain period of time called a "regional slot". This is for example the case in France for regional channels broadcast by "France 3" (registered mark) whereby a same national content is broadcast outside regional slots while each regional channel broadcasts a specific regional content during the regional slots.

2. TECHNOLOGICAL BACKGROUND

Figure 1:
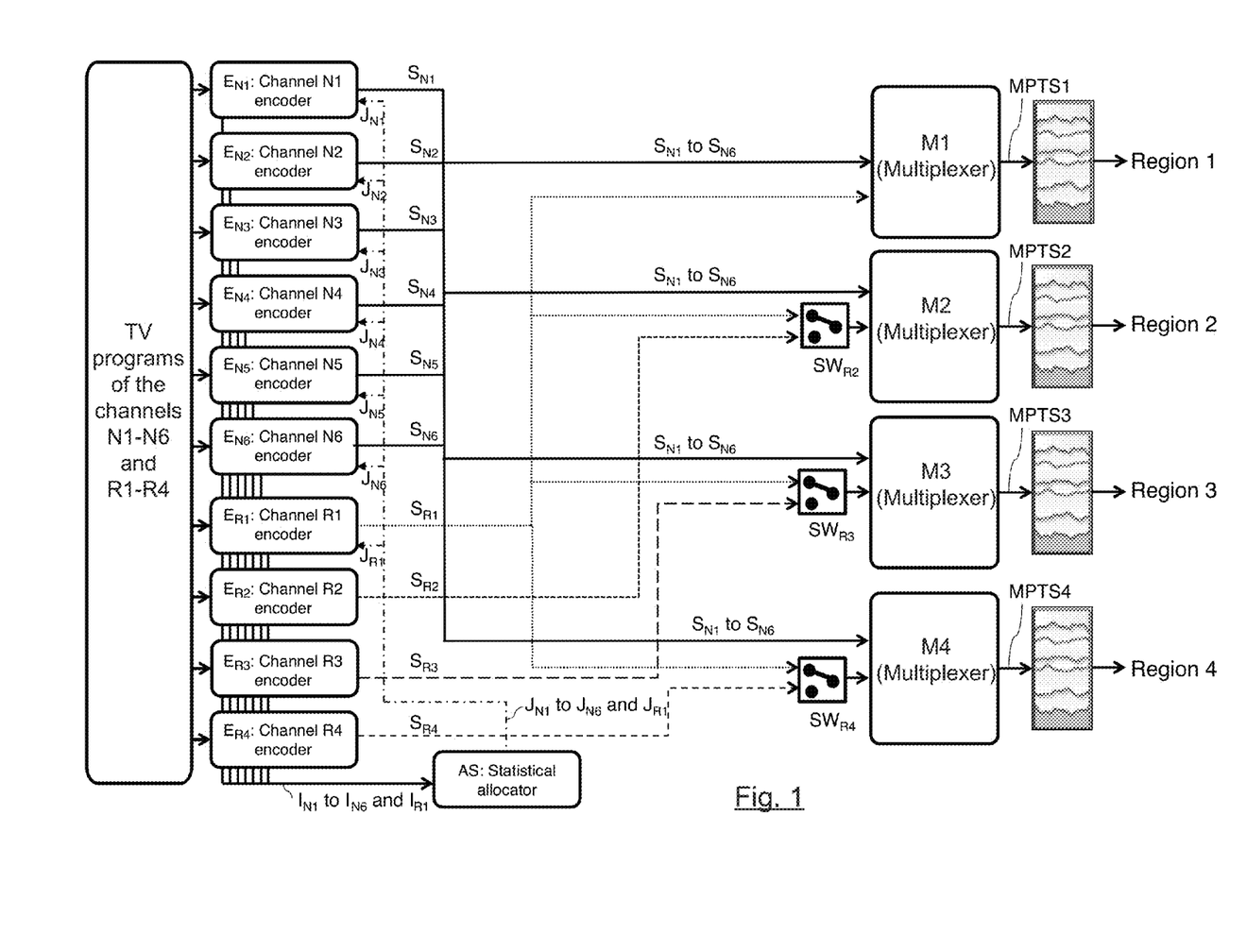
FIGS. 1 and 2, already described with reference to the prior art, illustrate a first known technique for taking into account regional variations in statistical multiplexing system.
Figure 2:
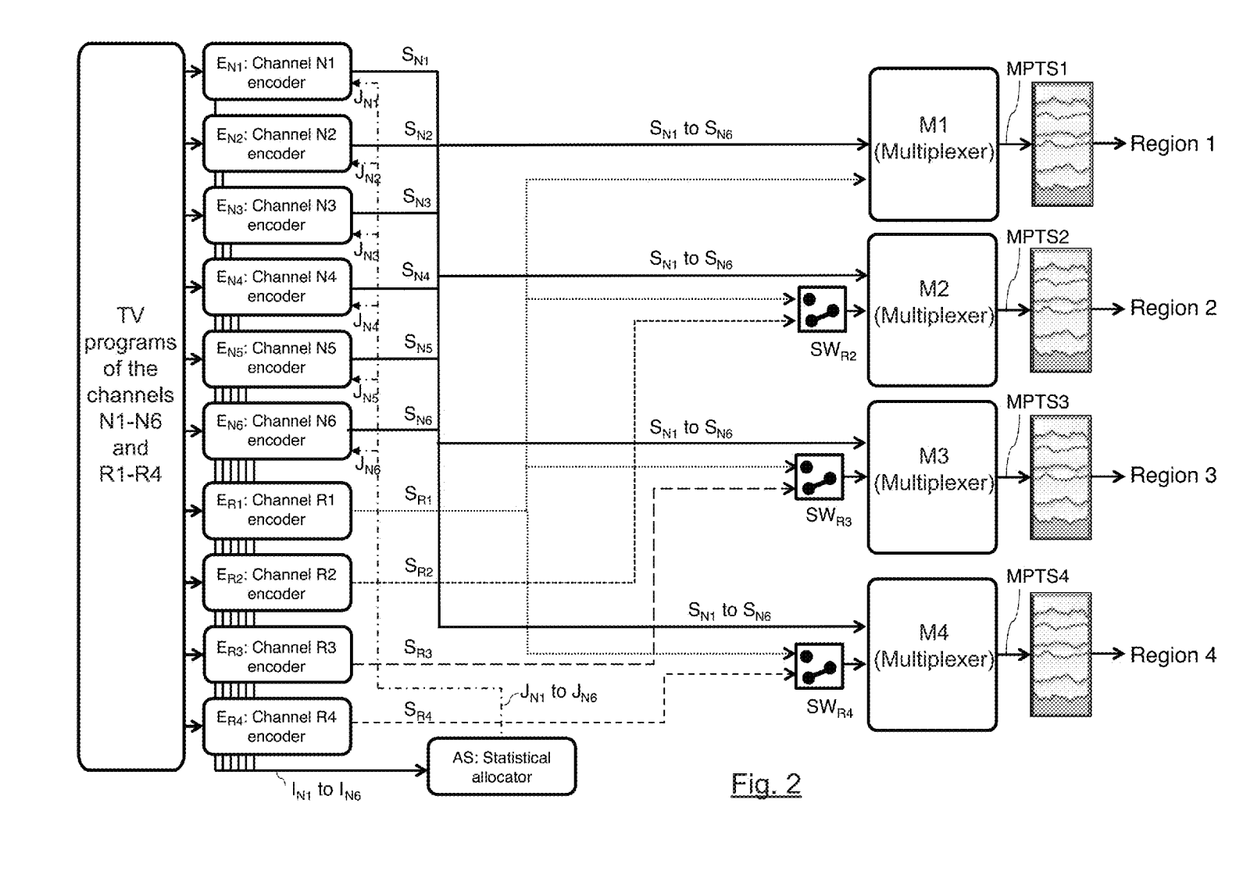

FIGS. 1 and 2 illustrate a first technique for taking account of regional variations in a statistical multiplexing system. More specifically, FIG. 1 illustrates the operation outside regional slots and FIG. 2 illustrates the operation during a regional slot.

The statistical multiplexing system comprises encoders (each associated with one of the television channels, a statistical allocator, switches and multiplexers.

Purely by way of an illustration, below in the description, we consider a plurality of television channels comprising six national channels (referenced N1 to N6) providing national programs and a group of four regional channels (referenced R1 to R4), each regional channel being associated with a different region ("region 1" to "region 4") and providing regional programs during regional slots and sharing national programs outside of regional slots.

In this context and as illustrated in FIG. 1, the encoders associated with the national channels N1 to N6 are referenced $E_{N1}$ to $E_{N6}$, and those associated with the regional channels R1 to R4 are referenced $E_{R1}$ to $E_{R4}$. Each encoder receives programs from the television channel that is associated with it and generates an output signal. The output signals are referenced $S_{N1}$ to $S_{N6}$ for the encoders associated with the national channels N1 to N6, and $S_{R1}$ to $S_{R4}$ for the encoders associated with the regional channels R1 to R4.

The purpose of each encoder is to convert non-compressed television programs into compressed television programs in the context of encoding or to convert television programs already compressed according to the first encoding format into television programs compressed according to a second encoding format, in the case of transcoding. Here below, in the document, the two notions of encoding and transcoding will be regarded as being identical.

For each encoder working at a variable bit rate (VBR mode), the statistical allocator (reference AS) receives at least one piece of information coming from this encoder and provides a set of encoding parameters to this encoder. Thus, in the case of FIG. 1, the encoders $E_{N1}$ to $E_{N6}$ (associated with the national channels N1 to N6) and the encoder $E_{R1}$ (associated with the regional channel R1) work at variable bit rate (VBR mode), and the statistical allocator receives information (referenced $I_{N1}$ to $I_{N6}$ and $I_{R1}$ respectively) coming from these encoders and provides a set of encoding parameters to each of these encoders (the different sets of encoding parameters are referenced $J_{N1}$ to $J_{N6}$ and $J_{R1}$). In the case of FIG. 2, the encoders $E_{R1}$ to $E_{R4}$ (associated with the regional channels R1 to R4) work at a constant bit rate (CBR mode) and only the encoders $E_{N1}$ to $E_{N6}$ (associated with the national channels N1 to N6) work at a variable bit rate (VBR mode). The statistical allocator receives the information $I_{N1}$ to $I_{N6}$ coming from these encoders and gives a set of encoding parameters $J_{N1}$ to $J_{N6}$ to each of these encoders.

The role of the statistical allocator is to dynamically select the set of encoding parameters of each encoder in order to optimize the video quality while at the same time complying with the bandwidth of the multiplexed signal (MPTS1 to MPTS4). In other words, each encoder communicates with the statistical allocator in order to send information (for example data on the state of the encoder and the complexity of the stream to be encoded) and receives new dynamic encoding parameters. For a given stream, each set of encoding parameters is defined not only as a function of the encoding criteria for encoding the concerned stream but also as a function of the criteria for the other streams managed by the statistical allocator. The statistical allocator can be present in different forms: it can especially take the form of an independent component or else it can be incorporated into already existing components of the system (encoder or multiplexer for example).

For each of the regions 2, 3 and 4, the system comprises a switch (referenced $SW_{R2}$, $SW_{R3}$ or $SW_{R4}$), the output of which can be selectively either the output signal $S_{R1}$ associated with the encoder $E_{R1}$ associated with the regional channel R1 or the output signal $S_{Ri}$ of the encoder $E_{Ri}$ associated with the regional channel Ri with "i" equal to 2, 3 or 4 depending on the whether the region concerned is the region 2, 3 or 4.

For each region, associated with a given regional channel (among those referenced R1 to R4), one multiplexer (among those referenced M1 to M4) generates a multiplexed signal (among those referenced MPTS1 to MPTS4) resulting from the multiplexing of the output signals $S_{N1}$ to $S_{N6}$ of the encoders associated with the national channels and of the output signal $S_{R1}$ of the encoder associated with a given regional channel, for the region R1, or of the output signal of the switch $SW_{R2}$, $SW_{R3}$ or $SW_{R4}$, for each of the regions 2, 3 and 4. The multiplexed signals are for example multiple program transport streams (MPTS).

FIG. 1 illustrates the working of the system outside regional slots. In this case, the programs of the regional channels R1 to R4 are identical and correspond to a same national content (national program). The statistical allocator manages all the programs of the national channels N1 to N6 and the program of only one of the regional channels (R1 in this example), through the positioning of the switches $SW_{R2}$, $SW_{R3}$ and $SW_{R4}$ in the "top" position). The programs of the national channels N1 to N6 and regional channels R1 to R4 are encoded in real time by the fleet of encoders. As already indicated above, the encoders $E_{N1}$ to $E_{N6}$ and $E_{R1}$ work at a variable bit rate (VBR mode). The statistical allocator receives information $I_{N1}$ to $I_{N6}$ and $I_{R1}$ coming from these encoders and gives them the sets of encoding parameters $J_{N1}$ to $J_{N6}$ and $J_{R1}$ (one set per encoder). The bit rates computed by the statistical allocator are variable. Each multiplexer (one per region) generates a multiplexed signal containing the programs of all the national channels N1 to N6 (in the encoded form $S_{N1}$ to $S_{N6}$, at output of the encoders $E_{N1}$ to $E_{N6}$) and the program of the regional channel R1 (in the encoded form $S_{R1}$, at output of the encoder $E_{R1}$). The multiplexed signals MPTS1 to MPTS4 (one per region) are therefore identical (same cumulated bit rate and compliance with the constraints of statistical multiplexing).

FIG. 2 illustrates the operation of the system during a regional slot. During a regional slot, the programs of the regional channels R1 to R4 are not identical. Each regional channel which does a regional variation can transmit a regional content (regional program) proper to it. When a regional variation is reported (for example by an SCTE-35 type trigger or SCTE 104 type trigger or any unspecified external trigger), a dynamic reconfiguration of certain key components of the system is done. Thus, the encoders $E_{R1}$ to $E_{R4}$ (associated with the regional channels R1 to R4) work at a constant bit rate (CBR mode). Only the encoders $E_{N1}$ to $E_{N6}$ (associated with the national channels N1 to N6) work at a variable bit rate (VBR mode). The statistical allocator therefore receives only the information $I_{N1}$ to $I_{N6}$ coming from the encoders $E_{N1}$ to $E_{N6}$ and provides a set of encoding parameters $J_{N1}$ to $J_{N6}$ only to each of these encoders. Besides, the switches $SW_{R2}$, $SW_{R3}$ and $SW_{R4}$ pass into the "low" position enabling each of the multiplexers M1 to M4 to multiplex, with the programs of all the national channels N1 to N6 (in encoded form $S_{N1}$ to $S_{N6}$, at output of the encoders $E_{N1}$ to $E_{N6}$), the program of one of the regional channels R1 to R4 (in encoded form $S_{R1}$ to $S_{R4}$, at output of one of the encoders $E_{R1}$ to $E_{R4}$). In other words, the multiplexer M1 receives the signals $S_{N1}$ to $S_{N6}$ and $S_{R1}$, the multiplexer M2 receives the signals $S_{N1}$ to $S_{N6}$ and $S_{R2}$, the multiplexer M3 receives the signals $S_{N1}$ to $S_{N6}$ and $S_{R3}$, and the multiplexer M4 receives the signal $S_{N1}$ to $S_{N6}$ and $S_{R4}$. The multiplexed signals MPTS1 to MPTS4 (one per region) are therefore different.

The first known technique has several drawbacks during a regional variation:
  the regional variation must be simultaneous in all the regions. This implies a very precise triggering so that the regional variation is as transparent as possible from the viewpoint of the user's experience. In addition, this makes it impossible to manage scenarios of the type entailing the local insertion of programs or advertisements without carrying out a global variation throughout all the regions;
  operational complexity: the regional variation requires the dynamic reconfiguration of the key components of the system (namely the encoding fleet, the statistical allocator, the switches and the multiplexers), and this must be done simultaneously;
  the efficiency of the statistical allocator is impacted, this being due to the reduction of the bandwidth, part of which is allocated to the regional channels, the programs of which are encoded at constant bit rate (CBR mode). This constraint is necessary in order to ensure a constant totalized bit rate in each region.

Figure 3:
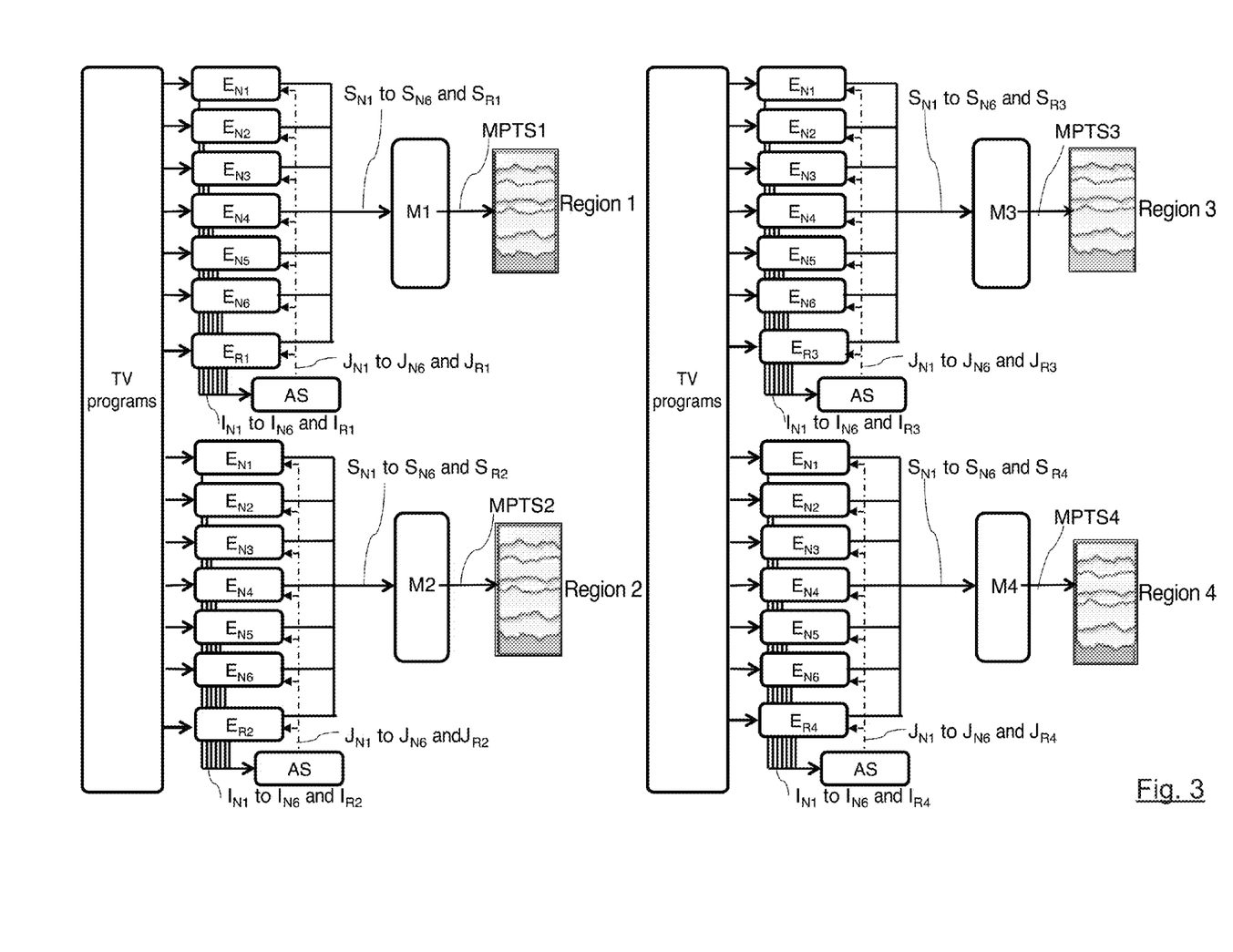
FIG. 3, already described with reference to the prior art, illustrates a second known technique for taking into account the regional variations in a statistical multiplexing system

FIG. 3 illustrates a second known technique for taking account of regional variations in a statistical multiplexing system. As compared with the first known technique, there is duplication for each of the regions of a fleet of encoders (comprising the encoders associated with the national channels and one encoder associated with the regional channel of this region) and a statistical allocator. This enables the use of a variable bit rate (VBR mode) for all the canals, (i.e. for all the television channels, whether national or regional).

More specifically, for a region i with $i \in \{1 \ldots 4\}$ in the example illustrated, the system comprises the encoders $E_{N1}$ to $E_{N6}$ and $E_{Ri}$, the statistical allocator AS (which receives the pieces of information $I_{N1}$ to $I_{N6}$ and $I_{Ri}$ coming from these encoders and gives them the sets of encoding parameters $J_{N1}$ to $J_{N6}$ and $J_{Ri}$) and the multiplexer Mi (which generates the signal MPTSi by multiplexing the signals $S_{N1}$ to $S_{N6}$ and $S_{Ri}$ coming from these encoders).

The major drawback of the second known technique is the exponential cost in terms of infrastructure since the operator must duplicate the encoders and the statistical allocator as many times as there are existing regions (one network head-end per region).

3. GOALS

The invention, in at least one embodiment is aimed especially at overcoming these different drawbacks of the prior art.

More specifically, it is a goal of at least one embodiment of the invention to provide a technique enabling regions to operate regional variations independently of each other in a context of statistical multiplexing of programs of a plurality of television channels, thus enabling the regional content to be adapted to a region (locality) without disturbing the other regions.

It is another goal of at least one embodiment of the invention to provide a technique for simplifying the operational management of a regional variation (especially in requiring no intervention in the dynamic sense of the term), be it at for encoding fleet, the statistical allocator or the multiplexers.

It is another goal of at least one embodiment of the invention to provide a technique for optimizing video quality and user experience (for example by preventing the untimely stoppage of video) during a regional variation (i.e. when passing from national content to a regional content).

4. SUMMARY OF THE INVENTION

One particular embodiment of the invention proposes a method for encoding and multiplexing programs of a plurality of television channels comprising:
  national channels providing national programs and
  at least one group of regional channels, each regional channel being associated with a different region and providing regional programs, during regional slots, and sharing national programs, outside regional slots, the method being implemented by a system comprising:
  a plurality of encoders, each associated with one of the television channels, each encoder receiving programs from the associated television channel and generating an output signal;
  a statistical allocator which, for each encoder working at a variable bit rate, receives at least one piece of information coming from said encoder and gives a set of encoding parameters to said encoder; and
  for each region, associated with a given regional channel, a multiplexer generating a multiplexed signal from output signals of the encoders associated with the national channels and from the output signal of the encoder associated with the given regional channel.

The encoders associated with the regional channels work at variable bit rate outside and during the regional slots. An aggregator device generates at least one piece of common information from the information coming from the encoders associated with the regional channels. The statistical allocator receives said at least one piece of common information and the information coming from the encoders associated with the national channels, and gives a dedicated set of encoding parameters to each encoder associated with one of the national channels and a common set of encoding parameters to the encoders associated with the regional channels.

The general principle of the invention therefore consists in making all the encoders (those associated with the national channels as well as those associated with a group of regional channels) work at variable bit rate (in VBR mode) outside and during the regional slots. This is possible through a novel element of the system: the aggregator device (also called the "group aggregator") which enables the statistical allocator to manage all the encoders associated with the regional channels of the group as if they were a single encoder. To this end, the aggregator device replaces the information coming from the encoders associated with the regional channels of the group with at least one piece of common information (denoted as $I_g$) that is given to the statistical allocator. Depending on this at least one piece of common information (and on the information coming from the encoders associated with the national channels), the statistical allocator generates a set of encoding parameters (denoted as $J_g$). In other words, all the encoders associated with the regional channels of the group work at variable bit rate (in VBR mode), but in using a common set of encoding parameters.

The proposed solution can be implemented for several groups of regional channels. In this case, the aggregator device generates at least one first piece of common information for a first group of regional channels, at least one second piece of common information for a second group of regional channels and so on and so forth. In one alternative embodiment, several aggregator devices are used, each of them for at least one group of regional channels. Similarly, the statistical allocator generates a first set of encoding parameters common to the encoders associated with the regional channels of a first group, a second set of encoding parameters common to the encoders associated with the regional channels of a second group, and so on and so forth.

The proposed solution has several advantages:
  the regional variations no longer need to be synchronized: all the regions are independent, thus enabling better flexibility in the management of program schedules per region as well as the insertion of advertisements, targeted by region;
  the regional variation is completely transparent: it is imperceptible from the viewpoint of the user experience;
  the permanent use of statistical multiplexing enables a more efficient distribution of the overall bit rate through the different national and regional streams (corresponding to the programs of the different national and regional channels), and therefore better video quality;
  simplifying operational management: no action or modification is necessary for the encoding fleet (no switching from CBR (constant bit rate) mode to VBR (variable bit rate) mode), as well the multiplexers (no dynamic configuration of the PMT tables, nor of any switches $SW_{R2}$ to $SW_{R4}$ (see FIGS. 1 and 2) as well as at the level of the statistical allocator (management of regional streams);
  the proposed architecture is simpler and less costly and preserves an ecosystem similar to that of existing solutions. It requires only one new element: the group aggregator which can be independent of the other components or can be incorporated in an existing component.

According to one particular aspect of the invention, for each of the encoders associated with the regional channels, said at least one piece of information belongs to the group comprising:
  information on the complexity of the programs to be encoded by the encoder;
  information on a state of the encoder; and
  information on a state of a virtual reception buffer associated with the encoder.

In one minimalistic embodiment, only one piece of information (of one of the types listed here above) is used.

In one particular embodiment, for each of the encoders associated with the regional channels, said at least one piece of information is a first n-tuple, the n components of which are information items of n different types, with $n \geq 2$, and said at least one piece of common information is a second n-tuple of which each component ranked i with $i \in \{1 \ldots n\}$, is a combination of the components of a same rank i of the first n-tuples.

The use of information n-tuples enables the statistical allocator to achieve more precise control over the encoders associated with the regional channels of the group.

According to one particular characteristic, said combination belongs to the group comprising averages, linear combinations and a combination of at least one MIN operator and/or at least one MAX operator.

Another embodiment of the invention proposes a system for encoding and multiplexing programs of a plurality of television channels comprising:
  national channels, providing national programs, and
  at least one group of regional channels, each regional channel being associated with a different region and providing regional programs during regional slots and sharing national programs outside regional slots, said system comprising:
a plurality of encoders each associated with one of the television channels, each encoder receiving the programs of the associated television channel and generating an output signal;
a statistical allocator which, for each encoder, working in variable bit rate mode receives at least one piece of information coming from said encoder and gives a set of encoding parameters to said encoder; and
for each region associated with a given regional channel, a multiplexer generating a multiplexed signal from the output signals of the encoders associated with the national channels and the output signal of the associated encoder associated with the given regional channel.

The encoders associated with the regional channels are configured to work in variable bit rate mode outside and during the regional slots. The system comprises an aggregator device configured to generate at least one piece of common information from information coming from the encoders associated with the regional channels. The statistical allocator is configured to receive said at least one piece of common information and the information coming from the encoders associated with the national channels, and to give a dedicated set of encoding parameters to each encoder associated with one of the national channels, and a common set of encoding parameters to the encoders associated with the regional channels.

5. LIST OF FIGURES

Other features and advantages of the invention shall appear from the following description: given by way of an indicative and non-exhaustive example, and from the appended figures of which.

6. DETAILED DESCRIPTION

In all the figures of the present document, the identical elements and steps are designated by one and the same numerical reference.

Figure 4:
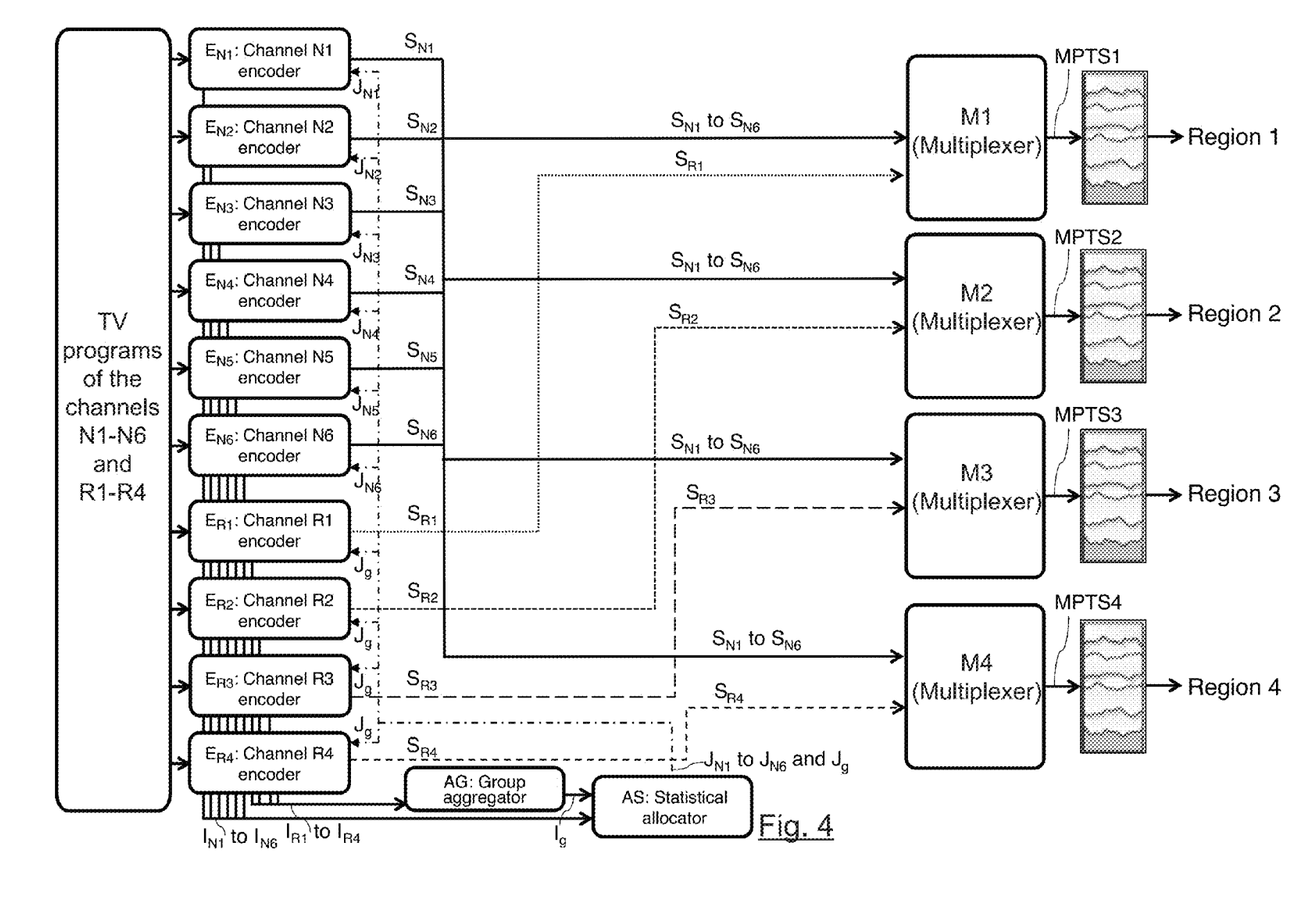
FIG. 4 illustrates a technique known according to one particular embodiment of the invention, for taking into account regional variations in a statistical multiplexing system.

Referring now to FIG. 4, we present a technique according to one particular embodiment of the invention for taking into account regional variations in a system with statistical multiplexing.

Purely by way of an illustration, we consider the same context as that of FIGS. 1 to 3, names the encoding and multiplexing of a plurality of television channels comprising six national channels N1 to N6 providing national programs and a group of four regional channels R1 to R4 each associated with a different region ("region 1" to "region 4") and providing regional programs, during regional slots and sharing national programs outside regional slots.

For example, in the French market, the regional channels R1 to R4 could correspond to the four regional channels of "France 3" (i.e. channels that broadcast one and the same national content outside periods of regional cutaway, and each of which broadcasts a specific regional content during a regional cutaway).

The invention is of course not limited to this number of national channels nor to this number of regional channels in a group. Nor is it limited to a single group of regional channels, and can be implemented with several groups of regional channels.

As in the first known technique of FIGS. 1 and 2, the system comprises:
a plurality of encoders all working at variable bit rate (in VBR mode) outside and during regional slots and comprising encoders $E_{N1}$ to $E_{N6}$ associated with national channels N1 to N6 and encoders $E_{R1}$ to $E_{R4}$ associated with the regional channels R1 to R4. Each encoder receives the programs of the television channel associated with it and generates an output signal: $S_{N1}$ to $S_{N6}$ for the encoders associated with the national channels N1 to N6 and $S_{R1}$ to $S_{R4}$ for the encoders associated with the regional channels R1 to R4;
a statistical allocator AS; and
multiplexers M1 to M4 (one per region): the multiplexer M1 generates a signal MPTS1 for the region 1 in multiplexing the signals $S_{N1}$ to $S_{N6}$ and $S_{R1}$, the multiplexer M2 generates a signal MPTS2 for the region 2 in multiplexing the signals $S_{N1}$ to $S_{N6}$ and $S_{R2}$, the multiplexer M3 generates a signal MPTS3 for the region 3 in multiplexing the signals $S_{N1}$ to $S_{N6}$ and $S_{R3}$, and the multiplexer M4 generates a signal MPTS4 for the region 4 in multiplexing the signals $S_{N1}$ to $S_{N6}$ et $S_{R4}$.

As compared with the first known technique of FIGS. 1 and 2, the system comprises a novel element, namely an aggregator device (also called an group aggregator) AG. This device can be present in different forms. It can especially take the form of an independent component or else it can be incorporated into one of the already existing components of the system (encoder, statistical allocator or multiplexer for example).

The aggregator device AG receives information $I_{R1}$ to $I_{R4}$ coming from the encoders $E_{R1}$ to $E_{R4}$ (associated with the regional channels R1 to R4). From this information, it generates one or more pieces of common information $I_g$.

The statistical allocator AS receives these pieces of common information $I_g$, as well as the pieces of information $I_{N1}$ to $I_{N6}$ coming from the encoders $E_{N1}$ to $E_{N6}$ associated with the national channels N1 to N6). From all this information, the statistical allocator provides a set of encoding parameters to each encoder, and more specifically:
a dedicated encoding parameter (referenced $J_{N1}$ to $J_{N6}$ respectively) to each of the encoders $E_{N1}$ to $E_{N6}$, and
a common set of encoding parameters (referenced $J_g$) to the encoders $E_{R1}$ to $E_{R4}$.

Thus, all the encoders $E_{N1}$ to $E_{N6}$ (associated with the national channels N1 to N6) work at variable bit rate (VBR mode), each with a set of encoding parameters that is dedicated to it ($J_{N1}$ to $J_{N6}$). All the encoders $E_{R1}$ to $E_{R4}$ (associated with the regional channels R1 to R4) also work in variable bit rate mode (VBR mode) but all use the same common set of encoding parameters ($J_g$).

In other words, the function of the aggregator device AG is to replace the information $I_{R1}$ to $I_{R4}$ coming from the encoders $E_{R1}$ to $E_{R4}$ dealing with the regional channels R1 to R4 (also called "groups of streams"), with the information $I_g$. This enables this group to be presented as a single television channel to the statistical allocator. In other words, the statistical allocator manages the set of decoders $E_{R1}$ to $E_{R4}$ as if it were a single (fictitious) encoder. It is for this single (fictitious) encoder that the statistical allocator generates a common set of encoding parameters ($J_g$), which actually is used by each of the encoders $E_{R1}$ to $E_{R4}$.

Should several groups of regional channels be dealt with, they are managed either by the same aggregator device or each by a distinct aggregator device.

In addition to the information of synchronization with the streams to be encoded, the pieces of information $I_{N1}$ to $I_{N6}$ and $I_{R1}$ to $I_{R4}$ (provided by the encoders) are for example data on the state of the encoders and the complexity of the streams to be encoded.

For example, each encoder provides information in the form of a triplet (i.e. an n-tuple with n=3) formed by the following pieces of information:
- a first piece of information (CPX) on the complexity of the programs to be encoded by the encoded (also called a "sequence") for this information and complexity, the invention takes for example the measurement in the French patent application No. FR3002062A1 or any other measurement of complexity;
- a second piece of information on a state of the encoder (for example a piece of information of the "bit rate-distortion statistics" type, a piece of information on the current video quality at output of the encoder (PSNR, SSIM, MSE measurement or any other measurement of video quality) or again a piece of information on the quantification pitch of the encoder;
- a third piece of information "RB info" on the state of a virtual reception buffer associated with the encoder (for example VBV in the MPEG2 case, HRD or CPB in the H.264 and HEVC cases).

In a minimalistic embodiment, only one or two of the three pieces of information listed above are used. In another embodiment, each encoder provides and n-tuple comprising more than three pieces of information (n>3).

The criteria of combination used to pass information contained in the information elements $I_{R1}$ to $I_{R4}$ to said at least one piece of information $I_g$, can be of different natures depending on the preferences defined by the operator of the system.

In particular, in the special case where the information $I_{R1}$ to $I_{R4}$ provided by the encoders $E_{R1}$ to $E_{R4}$ are first n-tuples with n≥2, the piece of common information $I_g$ is a second n-tuple, of which each component ranked i, with i∈{1 . . . n}, is a combination of the components of a same rank i of the first n-tuples. This combination is for example an average, a linear combination or again a combination of at least one operator MIN and/or at least one operator MAX.

Figure 5:
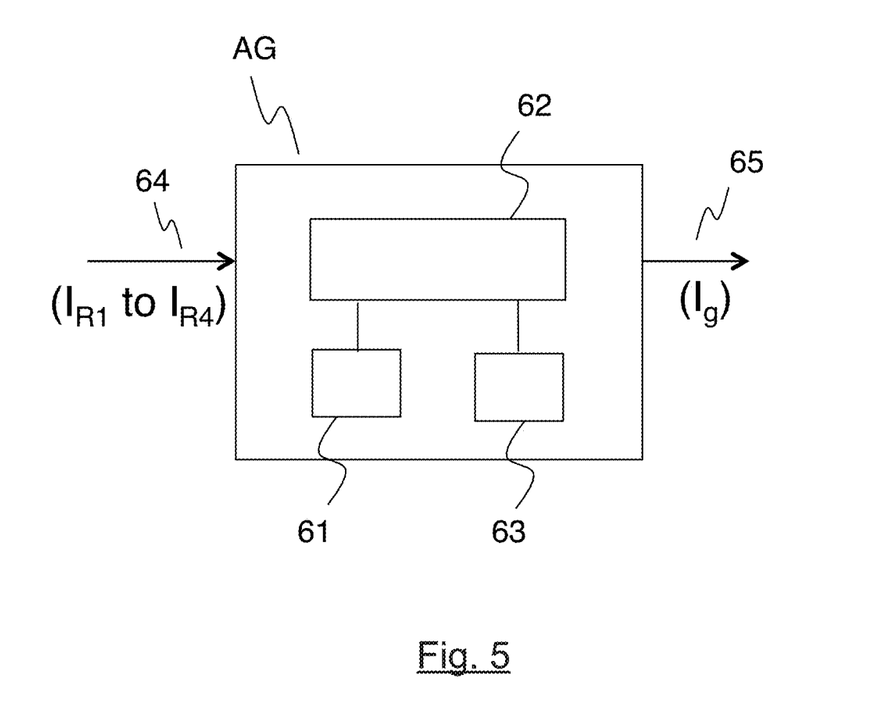
FIG. 5 is an example of a structure of the aggregator device of FIG. 4.

FIG. 5 is an example of a structure of the aggregator device AG of FIG. 4. This device (or unit, module or circuit) comprises a random-access memory 61 (for example a RAM), a processing unit 62 equipped for example with a processor and driven by a computer program stored in a read-only memory 63 (for example a ROM or a hard disk drive). At initialization, the code instructions of the computer program are for example loaded into the random-access memory 61 and then executed by the processor of the processing unit 62. The processing unit 62 inputs at 64 the information $I_{R1}$ to $I_{R4}$ and delivers the information $I_g$ at output 65.

FIG. 5 illustrates only one particular way, among several possible ways, of obtaining the group aggregator, of which the operation is described further above. Indeed, the technique of the invention is done differently:
- on a reprogrammable computation machine (a PC computer, a DSP processor or a microcontroller) executing a program comprising a sequence of instructions, or
- a dedicated computation machine (for example a set of logic gates such as an FPGA or an ASIC or any other hardware module).

In the case of an implementation on a reprogrammable computation machine, the corresponding program (i.e. the sequence of instructions) could be stored in a detachable storage medium (such as for example a floppy disk, a CD-ROM or a DVD-ROM) or non-detachable storage medium, this storage medium being partially or totally readable by a computer or a processor.

The invention claimed is:

1. Method for encoding and multiplexing programs of a plurality of television channels comprising:
national channels providing national programs and
at least one group of regional channels, each regional channel being associated with a different region and providing regional programs, during regional slots, and sharing national programs, outside regional slots, the method being implemented by a system comprising:
a plurality of encoders ($E_{N1}$-$E_{N6}$, $E_{R1}$-$E_{R4}$), each associated with one of the television channels, each encoder receiving programs from the associated television channel and generating an output signal ($S_{N1}$-$S_{N6}$, $S_{R1}$-$S_{R4}$);
a statistical allocator (AS) which, for each encoder working at a variable bit rate, receives at least one piece of information ($I_{N1}$-$I_{N6}$, $I_{R1}$-$I_{R4}$) coming from said encoder and provides a set of encoding parameters ($J_{N1}$-$T_{N6}$, $J_{R1}$-$J_{R4}$) to said encoder; and
for each region, associated with a given regional channel, a multiplexer (M1-M4) generating a multiplexed signal from output signals of the encoders associated with the national channels and from the output signal of the encoder associated with the given regional channel;
said method being characterized in that the encoders ($E_{R1}$-$E_{R4}$) associated with the regional channels work at variable bit rate outside and during the regional slots, in that an aggregator device (AG) generates at least one piece of common information ($I_g$) from the information ($I_{R1}$-$I_{R4}$) coming from the encoders ($E_{R1}$-$E_{R4}$) associated with the regional channels, and in that the statistical allocator receives said at least one piece of common information ($I_g$) and the information ($I_{N1}$-$I_{N6}$) coming from the encoders ($E_{N1}$-$E_{N6}$) associated with the national channels, and provides a dedicated set of encoding parameters ($J_{N1}$-$J_{N6}$) to each encoder ($E_{N1}$-$E_{N6}$) associated with one of the national channels and a common set of encoding parameters ($J_g$) to the encoders ($E_{R1}$-$E_{R4}$) associated with the regional channels.

2. Method according to claim 1 characterized in that, for each of the encoders ($E_{R1}$-$E_{R4}$) associated with the regional channels, said at least one piece of information ($I_{R1}$-$I_{R4}$) belongs to the group comprising:
information on the complexity of the programs to be encoded by the encoder;
information on a state of the encoder; and
information on a state of a virtual reception buffer associated with the encoder.

3. Method according to claim 2 characterized in that, for each of the encoders ($E_{R1}$-$E_{R4}$) associated with the regional channels, said at least one piece of information ($I_{R1}$-$I_{R4}$) is a first n-tuple, the n components of which are information items of n different types, with n≥2, and in that said at least one piece of common information ($I_g$) is a second n-tuple of which each component ranked i with i∈{1 ... n}, is a combination of the components of a same rank i of the first n-tuples.

4. Method according to claim 3, characterized in that said combination belongs to the group comprising:
   averages;
   linear combinations; and
   a combination of at least one MIN operator and/or at least one MAX operator.

5. System for encoding and multiplexing programs of a plurality of television channels comprising:
   national channels, providing national programs, and
   at least one group of regional channels, each regional channel being associated with a different region and providing regional programs during regional slots and sharing national programs outside regional slots, said system comprising:
   a plurality of encoders ($E_{N1}$-$E_{N6}$, $E_{R1}$-$E_{R4}$) each associated with one of the television channels, each encoder receiving the programs of the associated television channel and generating an output signal ($S_{N1}$-$S_{N6}$, $S_{R1}$-$S_{R4}$);
   a statistical allocator (AS) which, for each encoder, working in variable bit rate mode receives at least one piece of information ($I_{N1}$-$I_{N6}$, $I_{R1}$-$I_{R4}$) coming from said encoder and gives a set of encoding parameters ($J_{N1}$-$J_{N6}$, $J_{R1}$-$J_{R4}$) to said encoder; and
   for each region associated with a given regional channel, a multiplexer (M1-M4) generating a multiplexed signal from the output signals of the encoders associated with the national channels and from the output signal of the associated encoder associated with the given regional channel;
said system being characterized in that the encoders ($E_{R1}$-$E_{R4}$) associated with the regional channels are configured to work in variable bit rate mode outside and during the regional slots, in that it comprises an aggregator device (AG) configured to generate at least one piece of common information ($I_g$) from information ($I_{R1}$-$I_{R4}$) coming from the encoders ($E_{R1}$-$E_{R4}$) associated with the regional channels, and in that the statistical allocator is configured to receive said at least one piece of common information ($I_g$) and the information ($I_{N1}$-$I_{N6}$) coming from the encoders ($E_{N1}$-$E_{N6}$) associated with the national channels, and to give a dedicated set of encoding parameters ($J_{N1}$-$J_{N6}$) to each encoder associated with one of the national channels, and a common set of encoding parameters ($J_g$) to the encoders associated with the regional channels ($E_{R1}$-$E_{R4}$).

6. System according to claim 5, characterized in that, for each of the encoders ($E_{R1}$-$E_{R4}$) associated with the regional channels, said at least one piece of information ($I_{R1}$-$I_{R4}$) belongs to the group comprising:
   information on the complexity of the programs to be encoded by the encoder;
   information on a state of the encoder; and
   information on a state of a virtual reception buffer associated with the encoder.

7. System according to claim 6, characterized in that, for each of the encoders ($E_{R1}$-$E_{R4}$) associated with the regional channels, said at least one piece of information ($I_{R1}$-$I_{R4}$) is a first n-tuple, the n components of which are information items of n different types, with n≥2, and in that said at least one piece of common information ($I_g$) is a second n-tuple of which each component ranked i with i∈{1 ... n}, is a combination of the components of a same rank i of the first n-tuples.

8. System according to claim 7, characterized in that said combination belongs to the group comprising:
   averages;
   linear combinations; and
   a combination of at least one MIN operator and/or at least one MAX operator.

* * * * *

UNITED STATES PATENT AND TRADEMARK OFFICE
CERTIFICATE OF CORRECTION

PATENT NO. : 9,848,220 B2
APPLICATION NO. : 15/291752
DATED : December 19, 2017
INVENTOR(S) : Mederic Blestel, Olivier Milet and Thomas Fayoux Page 1 of 1

It is certified that error appears in the above-identified patent and that said Letters Patent is hereby corrected as shown below:

In the Claims

In Claim 1, Column 10, Line 36, Please delete "$(J_{N1} + T_{N6}, J_{R1}-J_{R4})$", and insert --$(J_{N1} + J_{N6}, J_{R1}-J_{R4})$--

Signed and Sealed this
Twenty-third Day of April, 2019

Andrei Iancu
*Director of the United States Patent and Trademark Office*